(12) United States Patent
Chen et al.

(10) Patent No.: US 12,250,451 B2
(45) Date of Patent: Mar. 11, 2025

(54) CONDITIONAL DISPLAY OF OBJECT CHARACTERISTICS

(71) Applicant: Nokia Technologies Oy, Espoo (FI)

(72) Inventors: Yu Chen, Shanghai (CN); Wenyi Xu, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 303 days.

(21) Appl. No.: 17/433,578

(22) PCT Filed: Mar. 11, 2019

(86) PCT No.: PCT/CN2019/077684
§ 371 (c)(1),
(2) Date: Aug. 24, 2021

(87) PCT Pub. No.: WO2020/181461
PCT Pub. Date: Sep. 17, 2020

(65) Prior Publication Data
US 2022/0124256 A1    Apr. 21, 2022

(51) Int. Cl.
*H04N 23/63* (2023.01)
*G06V 40/16* (2022.01)
*H04N 23/60* (2023.01)
*H04N 23/611* (2023.01)

(52) U.S. Cl.
CPC ......... *H04N 23/633* (2023.01); *G06V 40/174* (2022.01); *H04N 23/611* (2023.01); *H04N 23/64* (2023.01)

(58) Field of Classification Search
CPC .... H04N 23/633; H04N 23/64; H04N 23/611; G06V 40/174

USPC ....................................................... 348/14.07
See application file for complete search history.

(56) References Cited

U.S. PATENT DOCUMENTS

| 8,111,280 | B2 | 2/2012 | Kim | |
| 9,478,030 | B1* | 10/2016 | Lecky | ...................... G06T 7/62 |
| 9,672,416 | B2 | 6/2017 | Zhang et al. | |
| 9,832,452 | B1 | 11/2017 | Fotland et al. | |
| 2011/0007142 | A1* | 1/2011 | Perez | ................... A63F 13/213 |
| | | | | 348/E7.085 |
| 2011/0019741 | A1* | 1/2011 | Kameyama | ............ H04N 19/33 |
| | | | | 375/E7.125 |

(Continued)

FOREIGN PATENT DOCUMENTS

| CN | 102239460 A | 11/2011 |
| CN | 104932768 A | 9/2015 |

(Continued)

OTHER PUBLICATIONS

Office action received for corresponding Chinese Patent Application No. 201980093987.7, dated Mar. 7, 2022, 6 pages of office action and no page of translation/summary available.

(Continued)

*Primary Examiner* — Binh Kien Tieu
(74) *Attorney, Agent, or Firm* — McCarter & English, LLP

(57) ABSTRACT

An apparatus comprising means for receiving information indicative of a relative placement of an object and a camera; determining, in dependence on the information, whether a condition associated with relative placement of the object and the camera is satisfied; and causing display of an indication of at least one detected characteristic of the object if the condition is satisfied.

20 Claims, 9 Drawing Sheets

(56) References Cited

U.S. PATENT DOCUMENTS

| | | | |
|---|---|---|---|
| 2011/0263946 A1* | 10/2011 | el Kaliouby | A61B 5/16 600/300 |
| 2012/0092445 A1 | 4/2012 | McDowell et al. | |
| 2014/0258850 A1* | 9/2014 | Carey | G06F 16/5866 715/243 |
| 2015/0161998 A1* | 6/2015 | Park | G10L 15/24 704/231 |
| 2016/0198145 A1* | 7/2016 | Lee | G06T 7/85 348/47 |
| 2017/0126968 A1* | 5/2017 | Somanath | H04N 13/15 |
| 2017/0147866 A1* | 5/2017 | Tokui | G06V 40/165 |
| 2017/0371421 A1 | 12/2017 | Parshionikar et al. | |
| 2018/0027307 A1 | 1/2018 | Ni et al. | |
| 2018/0160982 A1* | 6/2018 | Laszlo | A61B 5/11 |
| 2018/0314881 A1 | 11/2018 | Sud et al. | |
| 2021/0004589 A1* | 1/2021 | Turkelson | G06V 30/19173 |
| 2022/0132056 A1* | 4/2022 | Zahnert | H04N 13/271 |

FOREIGN PATENT DOCUMENTS

| | | |
|---|---|---|
| CN | 105611153 A | 5/2016 |
| CN | 105744254 A | 7/2016 |
| WO | 2013/091157 A1 | 6/2013 |
| WO | 2017/098524 A1 | 6/2017 |
| WO | 2018/104356 A1 | 6/2018 |
| WO | 2018/128996 A1 | 7/2018 |

OTHER PUBLICATIONS

Darwin, "The Expression of the Emotions in Man and Animals", 1872, 399 pages.

"Sensirion presents the smallest and most accurate gas and pressure sensors", Sensirion, Retrieved on Aug. 17, 2021, Webpage available at : https://www.sensirion.com/en/about-us/newsroom/news-and-press-releases/detail/news/sensirion-presents-the-smallest-and-most-accurate-gas-and-pressure-sensors/.

"Pressure Sensors", ST, Retrieved on Aug. 17, 2021, Webpage available at : https://www.st.com/en/mems-and-sensors/pressure-sensors.html?querycriteria=productId=SC1316.

Lengyel, "Mathematics for 3D Game Programming and Computer Graphics", Cengage Learning, 3rd Edition, Jun. 2, 2011, 566 pages.

"Anhttran/Extreme_3D_Faces", Github, Retrieved on Aug. 17, 2021, Webpage available at : https://github.com/ anhttran/extreme_3d_faces.

Tran et al., "Extreme 3D Face Reconstruction: Seeing Through Occlusions", IEEE/CVF Conference on Computer Vision and Pattern Recognition, Jun. 18-23, 2018, pp. 3935-3944.

"How Emotion Analysis is Already Changing Lives", Plotto, Retrieved on Nov. 16, 2018, Webpage available at : http://plotto.com/news-blog/emotion-analysis-and-video-research.

Masai et al., "Facial Expression Recognition in Daily Life by Embedded Photo Reflective Sensors on Smart Eyewear", Proceedings of the 21st International Conference on Intelligent User Interfaces, Mar. 2016, pp. 317-326.

"Smart Eye Acquires Affectiva", Affectiva, Retrieved on Aug. 17, 2021, Webpage available at : https://www.affectiva.com/.

Haag et al., "Emotion Recognition Using Bio-Sensors: First Steps Towards an Automatic System", Tutorial and Research Workshop on Affective Dialogue Systems, 2004, 10 pages.

International Search Report and Written Opinion received for corresponding Patent Cooperation Treaty Application No. PCT/CN2019/077684, dated Nov. 18, 2019, 10 pages.

Rejection Decision received for corresponding Chinese Patent Application No. 201980093987.7, dated Jul. 28, 2022, 3 pages of office action and no page of translation/summary available.

* cited by examiner

CONDITIONAL DISPLAY OF OBJECT CHARACTERISTICS

TECHNOLOGICAL FIELD

Embodiments of the present disclosure relate to the conditional display of object characteristics. Some relate to the conditional display of detected facial characteristics, conditional on the relative placement of a user's head and a camera.

BACKGROUND

When a user positions a camera to capture still or moving images of an object such as their own head or another person's head, the camera-holder (e.g. the user's hands) may shake which can cause camera-shake. Further, the user or camera-holder may inadvertently move such that the object is no longer positioned within the camera's field of view or is oriented away from the camera. Some image-shake problems can be solved using anti-shaking lenses or image stabilization techniques. However, such techniques can only handle relatively subtle shaking and not problems associated with incorrect relative placement of the head and the camera. If the relative placement is incorrect, then useful characteristics of the object such as facial expression cannot be easily ascertained from the captured images.

BRIEF SUMMARY

According to various, but not necessarily all, embodiments there is provided an apparatus comprising means for: receiving information indicative of a relative placement of an object and a camera; determining, in dependence on the information, whether a condition associated with relative placement of the object and the camera is satisfied; and causing display of an indication of at least one detected characteristic of the object if the condition is satisfied.

In some, but not necessarily all examples, the apparatus comprises means for causing display of image data captured by the camera without the indication, if the condition is not satisfied.

In some, but not necessarily all examples, when the condition is satisfied, the display of an indication of at least one detected characteristic replaces at least part of the displayed image data.

In some, but not necessarily all examples, the object comprises a human head.

In some, but not necessarily all examples, the detected characteristic is dependent on facial expression.

In some, but not necessarily all examples, the apparatus comprises means for causing display of indications of a plurality of detected characteristics of the object, if the condition is satisfied.

In some, but not necessarily all examples, the plurality of detected characteristics are associated with a plurality of different features of a face and/or body.

In some, but not necessarily all examples, the relative placement comprises relative position and/or relative orientation.

In some, but not necessarily all examples, satisfaction of the condition is dependent on whether at least part of the object is positioned outside a field of view of the camera.

In some, but not necessarily all examples, satisfaction of the condition is dependent on whether the object is oriented to face away from to the camera.

In some, but not necessarily all examples, satisfaction of the condition is dependent on whether the orientation of the object is pitched at least upwardly relative to an optical axis associated with the camera.

In some, but not necessarily all examples, the information indicative of the relative placement is from at least one first sensor configured to detect a change in the relative placement.

In some, but not necessarily all examples, the at least one first sensor comprises an inertial measurement unit and/or an imaging sensor.

In some, but not necessarily all examples, the apparatus comprises means for detecting the characteristic of the object in dependence on information indicative of the characteristic received from at least one second sensor.

In some, but not necessarily all examples, the at least one second sensor comprises at least one wearable sensor.

In some, but not necessarily all examples, the at least one second sensor is configured to detect the effect of muscle movement on a measurand.

In some, but not necessarily all examples, the at least one second sensor comprises a force sensor and/or a bend sensor and/or a proximity sensor and/or or a capacitance sensor and/or an inertial measurement unit and/or an electromyography sensor.

In some, but not necessarily all examples, the displayed indication is based on a reconstruction of the object and is manipulated based on at least one of the at least one detected characteristic.

In some, but not necessarily all examples, the reconstruction of the object is based on pre-captured images of the object.

In some, but not necessarily all examples, the manipulation is based on at least one of the at least one detected characteristic and machine learning.

In some, but not necessarily all examples, the apparatus comprises means for periodically updating the displayed indication during a video communication session in which the indication is communicated between devices.

According to various, but not necessarily all, embodiments there is provided a device comprising the apparatus and the camera.

According to various, but not necessarily all, embodiments there is provided a system comprising the apparatus, and at least one of: the camera; at least one of the first sensor; or at least one of the second sensor.

According to various, but not necessarily all, embodiments there is provided a method comprising:
receiving information indicative of a relative placement of an object and a camera;
determining, in dependence on the information, whether a condition associated with relative placement of the object and the camera is satisfied; and
causing display of an indication of at least one detected characteristic of the object if the condition is satisfied.

According to various, but not necessarily all, embodiments there is provided a computer program that, when run on a computer, performs:
causing receiving information indicative of a relative placement of an object and a camera;
causing determining, in dependence on the information, whether a condition associated with relative placement of the object and the camera is satisfied; and
causing display of an indication of at least one detected characteristic of the object if the condition is satisfied.

According to various, but not necessarily all, embodiments there is provided examples as claimed in the appended claims.

BRIEF DESCRIPTION

Some example embodiments will now be described with reference to the accompanying drawings in which.

DETAILED DESCRIPTION

Figure 1:
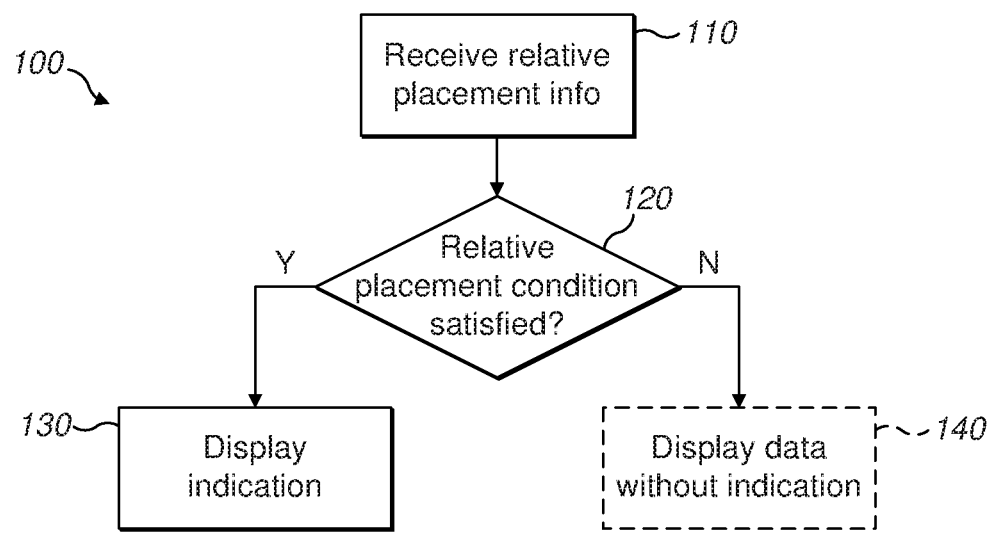
FIG. 1 illustrates an example of a method.

With reference to FIG. 1 to FIG. 4D, FIG. 1 illustrates a method 100 comprising: receiving 110 information indicative of a relative placement of an object and a camera 206 (imaging sensor); determining 120, in dependence on the information, whether a condition associated with relative placement of the object and the camera 206 is satisfied; and causing 130 display of an indication 406 of at least one detected characteristic of the object if the condition is satisfied. Optionally, if the condition is not satisfied then image data 402 captured by the camera 206 is displayed (block 140), without the indication 406.

In the examples disclosed below, but not necessarily in all examples, the object is a human head of the user of the camera 206. In other examples, the object could be the head of a human other than the user of the camera 206, or an animal head.

In the examples disclosed below, but not necessarily in all examples, the camera 206 is configured as a video camera. The video camera 206 captures moving images as the method 100 is performed. Additionally or alternatively, the camera 206 may be configured to capture still images. The camera 206 may be a visual light camera, or could be configured to image other wavelengths in the electromagnetic spectrum.

An example implementation of the method 100 is described below, with particular reference to FIGS. 1 to 4D.

Block 110 is described in further detail. Block 110 comprises receiving information indicative of the relative placement of the head 216 and the camera 206.

When a camera 206 is set up to capture images of the user's head 216, the relative placement of the camera 206 and the head 216 may temporally change. At times, their head 216 may be positioned outside the camera's field of view 222 (less than 360 degrees). At times, their head 216 may be too near or too far from the camera 206. At times, their head 216 may be imaged at a sub-optimal angle so that the user's face may not be clear. Sometimes, a user may become tired from holding the camera 206 (e.g. hand-held camera) up, and their arms may drop so that the user's head 216 is not parallel to an optical axis 224 of the camera 206 and is imaged at a sub-optimal angle. In a further example, a user may wish to multi-task in a way that requires them to exit the field of view 222 of the camera 206.

The above difficulties with maintaining a desired relative placement can prevent subtle emotions from being captured by the camera 206, for example emotions conveyed by facial expressions. Emotion can deliver significantly more content than words, which represents a potential advantage of video-camera communication over text-based communication.

The method 100 of FIG. 1 advantageously provides improved images of the user, and can provide contextual information about the characteristics of the user's head, such as facial expressions, more reliably.

Therefore, information indicative of the relative placement of the head 216 and the camera 206 is received at block 110, to monitor the relative placement. The monitoring may be performed automatically.

In some, but not necessarily all examples, the information indicative of the relative placement is from at least one first sensor configured to detect a change in the relative placement.

The at least one first sensor is a sensor(s) selected from a first group of one or more sensors. The first group of sensors may comprise an inertial measurement unit. The inertial measurement unit may comprise an accelerometer and/or a gyroscope. One inertial measurement unit corresponds to one sensing modality and one axis of measurement. The first group of sensors may comprise a plurality of inertial measurement units, defining multiple sensing modalities and/or multiple sensing axes. The inertial measurement unit(s) may comprise a three-axis accelerometer, and/or a three-axis gyroscope. The first group of sensors may comprise an imaging sensor such as the camera 206 described above (or another camera). The imaging sensor may be a 3D imaging sensor, such as a stereo camera or plenoptic camera, or may be a 2D imaging sensor.

Figure 2:
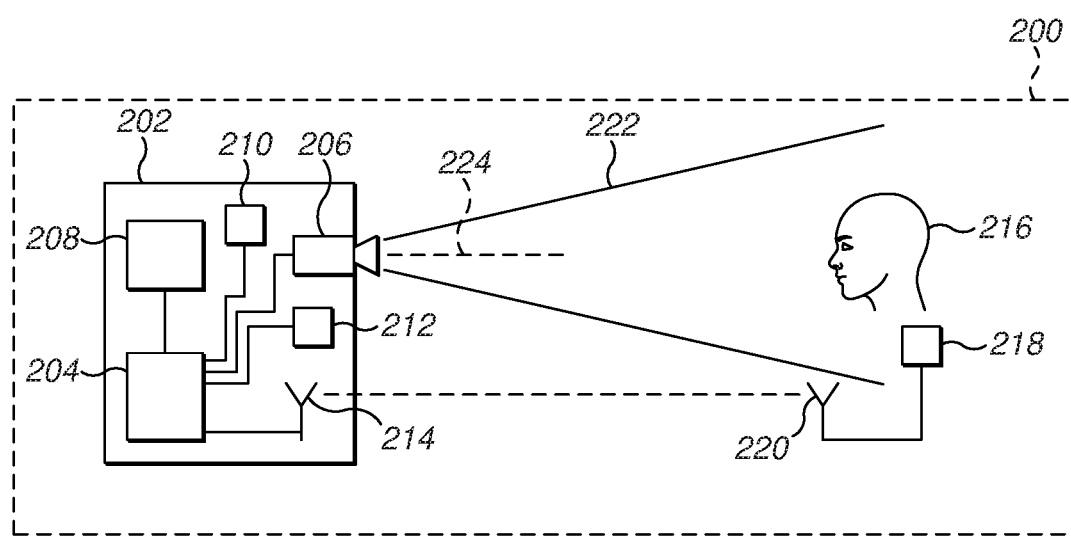
FIG. 2 illustrates an example of a system and a device.

The first group of sensors may comprise a sensor 212 on a same device as the camera 206, see for example FIG. 2 which shows a device 202 comprising a camera 206 and a first sensor 212. Additionally or alternatively, the first group of sensors may comprise a sensor on the user's head 216 and/or body, positioned to enable monitoring of the relative position.

The received information may be processed to determine the relative placement, defined as relative position and/or orientation. In some, but not necessarily all examples, the processing could perform dead reckoning. If the received information comprises image data, a head pose recognition algorithm could be applied.

To enable orientation to be determined accurately, the first sensor's orientation relative to the host camera device and/or user may be a constant, for instance so that inertial measurement signals are consistent. If the received information comprises image data, the direction of the user's head 216 may be detected using eye gaze tracking and/or head pose estimation. Head pose estimation is a more accurate indicator of sub-optimal head orientation than eye gaze tracking.

Once the information is received at block 110, the method 100 proceeds to block 120 as described below.

Block 120 comprises determining, in dependence on the information, whether a condition associated with relative placement of the head 216 and the camera 206 is satisfied. The condition may be associated with deviation from an acceptable relative placement. In some, but not necessarily all examples, determining whether a deviation of the relative placement from an acceptable relative placement is acceptable could depend on whether a deviation from a reference relative placement exceeds a threshold. The reference relative placement may comprise a reference acceptable relative positioning such as the head being centered in the camera's field of view 222. Additionally or alternatively, the reference relative placement may comprise a reference acceptable relative orientation such as the head direction being parallel to the optical axis 224. The threshold may be configured to permit some deviation of relative placement from the reference relative placement without the condition being satisfied. In other examples, the determination of acceptability could depend on whether certain facial features are identified by image analysis of image data from the camera 206. Examples of threshold-based and feature-tracking approaches are described below.

Figure 3A:
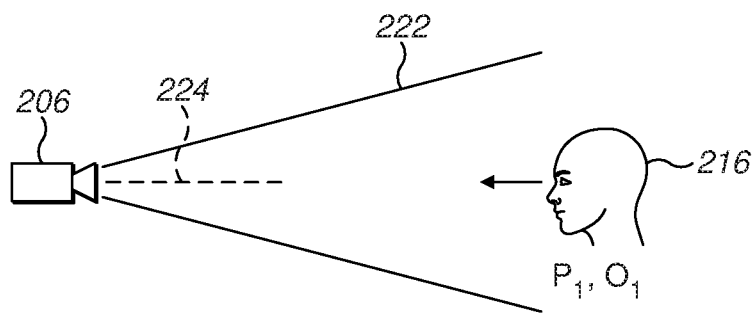
FIG. 3A illustrates an example of an object at a first relative position and first relative orientation.
Figure 3B:
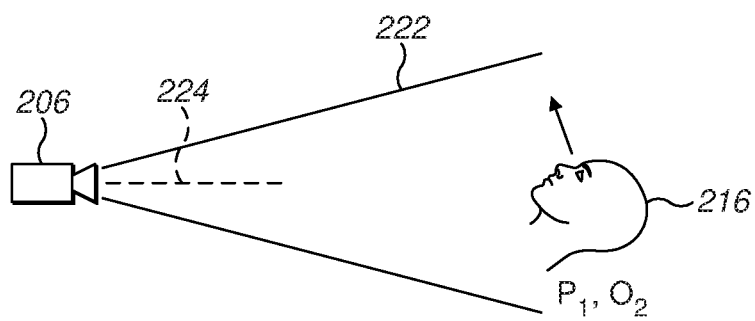
FIG. 3B illustrates an example of the object at a second relative orientation.
Figure 3C:
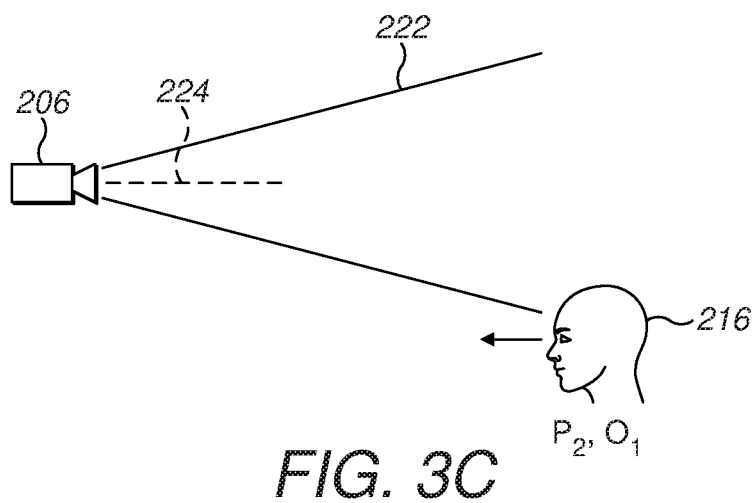
FIG. 3C illustrates an example of the object at a second relative position.
Figure 4A:
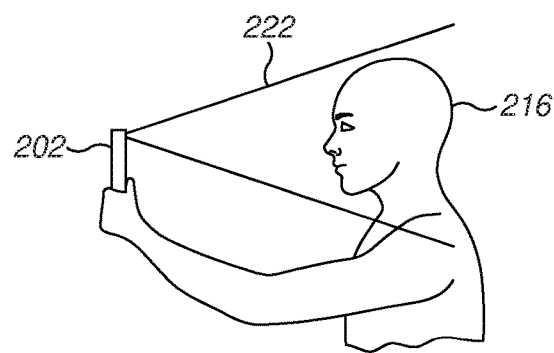
FIG. 4A illustrates an example of a human head at a first relative orientation.
Figure 4B:
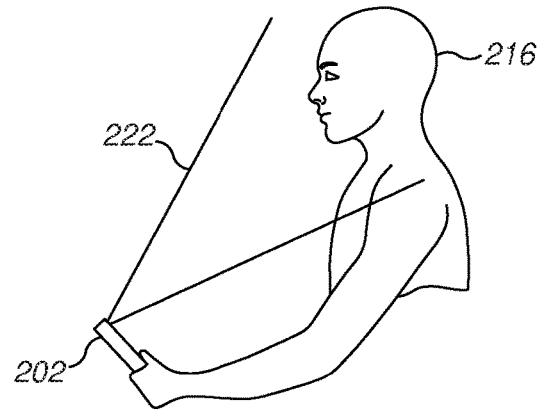
FIG. 4B illustrates an example of a human head at a second relative orientation.

FIGS. 3A to 3C represent three different relative placements, two of which satisfy the condition and one of which does not satisfy the condition. FIGS. 4A and 4B represent two different relative placements, one of which satisfies the condition and one of which does not satisfy the condition.

In FIG. 3A and FIG. 4A, the relative placement of the head 216 and camera 206 results in a first relative position P1 and a first relative orientation O1. The first relative position is within the field of view 222 of the camera 206. The first relative orientation is substantially parallel to the optical axis 224 of the camera 206, and the head 216 is looking towards the camera 206 (i.e. frontal orientation).

Satisfaction of the condition may depend on whether at least part of the head 216 is determined to be positioned outside the field of view 222. The first relative position in FIG. 3A does not satisfy the condition because the head 216 is within the field of view 222 and is oriented frontally to the camera 206 to provide a clear view of facial features.

For the relative positioning to satisfy the condition, the relative positioning may need to change such that at least part of the head 216 is positioned outside the field of view 222, as a result of moving the camera 206 and/or head 216. For example, in FIG. 3C the head 216 is at a second position P2 relative to the camera 206 such that at least part of the head 216 is outside the field of view 222, causing the condition to be satisfied.

In some examples, satisfaction of the condition may require the whole head 216 to exit the field of view 222. In other examples, satisfaction of the condition may require at least a part of the head 216 to exit the field of view 222, such as more than 50% of the head 216 exiting the field of view 222. In some examples, moving the head 216 closer to the camera 206, such that the head 216 is cropped at the edges of the field of view 222, does not affect whether the condition is satisfied. Satisfaction of the condition may therefore be determined in dependence on a centering of the head 216 in the field of view 222. For example, satisfaction of the condition may be dependent on whether a tracked reference location (e.g. centre) of the head 216 exits the field of view 222 or comes within a threshold distance of an edge of the field of view 222, or whether an identified facial feature (e.g. mouth, eyebrows) of the head 216 capable of expressing emotion exits the field of view 222. If the head 216 moves off-centre, the likelihood of satisfaction of the condition may increase.

In FIG. 3B and FIG. 4B the head 216 and camera 206 are at a second relative orientation O2. The second relative orientation in FIG. 3B satisfies the condition because although the head 216 is still within the field of view 222 of the camera 206, the head 216 is pointing away from the camera 206 (oriented non-frontally). The non-frontal relative orientation can hide emotional context.

In some examples, satisfaction of the condition depends on whether the relative orientation exceeds a threshold. The threshold may be selected from the range greater than 0 degrees from the optical axis 224, to approximately 90 degrees from the optical axis 224. In some examples, the range may be from approximately 20 degrees to approximately 60 degrees. This reduces false positive satisfactions of the condition if the user merely glances around, and ensures that the condition is satisfied when facial features are no longer clearly in view.

In some examples, the threshold may be dependent on which axis the change in relative orientation occurs in. For example, if the user looks up so that the orientation is 'from below', the threshold may be lower than if the view was a 'from side' view. This is because emotional context may be harder to infer in a 'from below' view than in a side view. Further, a 'from below' view is regarded as an unflattering view. In some examples, satisfaction of the condition is dependent on whether the orientation of the head 216 is pitched (oriented) at least upwardly relative to the optical axis 224. The condition may not be satisfied if the head 216 is pitched not upwardly, e.g. downwardly.

Satisfaction of the condition may be determined in dependence on the instant relative placement, and optionally on the past relative placement. For instance, if the head 216 was never in the field of view 222 to begin with, the condition may not be capable of being satisfied.

In order to reduce false positives caused by small movements such as camera shake, satisfaction of the condition may require the unacceptable relative placement to occur for an above-threshold duration and/or at an above-threshold frequency.

In the above example, the condition can be satisfied by relative position changes alone, and can be satisfied based on relative orientation changes alone. In other examples, satisfaction of the condition depends on one of relative position or relative orientation but not the other. In further examples, the condition can be satisfied only by a combination of relative placement and relative orientation, but not relative placement or relative orientation individually.

Satisfaction of the condition is necessary, and optionally sufficient, to proceed to block 130 which is described below.

Block 130 of FIG. 1 comprises causing display of an indication 406 of at least one detected characteristic of the head 216 if the condition is satisfied. The detected characteristic may be dependent on facial expression. Facial expressions provide emotional context. Facial expressions are personal to users and therefore represent their individual characteristics. Therefore, emotional context can advantageously be communicated despite the sub-optimal relative placement of the head 216 and camera 206. Displaying a detected characteristic indicative of the user's actual expression conveys emotional context more clearly than, for example, displaying a non-detected characteristic that represents a generic smile (e.g. avatar or emoticon). A detailed discussion of how the indication 406 can be determined and how the characteristic can be detected is provided later.

Figure 4C:
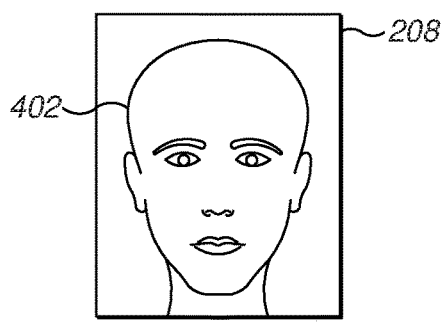
FIG. 4C illustrates an example of camera image data of the human head at the first relative orientation.
Figure 4D:
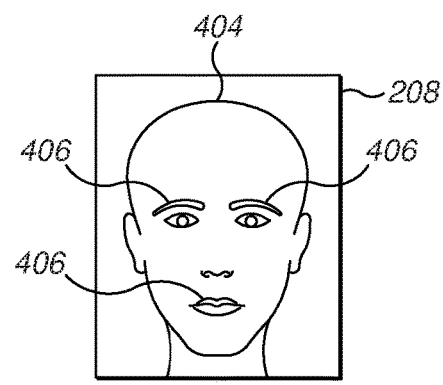
FIG. 4D illustrates an example of an indication of at least one detected characteristic of the human head.

Indications of detected current characteristics are shown in FIG. 4D. Indications 406 of a smile and raised eyebrows have been detected, and are indicated by a smile and raised eyebrows in the representation 404.

A display on which the indication 406 of FIG. 4D is displayed may be local to the camera 206, such as a display 208 of the device 202 of FIG. 2. Additionally or alternatively, a display on which the indication 406 is displayed may be remote from the camera 206, such as a display of a remote device for receiving image data as part of a video communication session. This helps remote third-party users to infer the emotions of the user when they cannot see the user.

In some, but not necessarily all examples, the representation 404 of FIG. 4D is a rendered reconstruction of the whole head 216, or at least a part of the head 216, wherein at least part of the reconstruction is configured to indicate at least one of the at least one detected characteristic of the head 216. The term 'reconstruction' would be understood to mean an at least partially computer-generated model, constructed automatically based on information indicative of the specific user's actual head 216 and configured to be rendered on a display 208. The reconstruction may be based on a 2D or 3D computer model of the specific user's actual head 216. An effect of using a reconstruction is that the user's facial expressions and emotions are conveyed in a more accurate and familiar way, compared to indicating the detected characteristic(s) in simpler ways.

In simpler examples that do not require a reconstruction, the indication 406 could instead comprise a content item such as text, symbols or a pre-captured camera image (e.g. pre-captured photograph or avatar associated with the detected characteristic). The content item may be selected using an emotion classification algorithm for associating the at least one detected characteristic with specific ones of a plurality of selectable content items associated with different detected characteristics.

FIG. 4D shows a representation 404 of the user's head 216 which may be displayed as a result of block 130. In this example, the user's head 216 has a relative orientation as shown in FIG. 4B and FIG. 3B, that causes satisfaction of the condition.

FIG. 4D may look the same or similar if relative positioning was the reason for satisfaction of the condition, rather than relative orientation.

The representation 404 may include features of the head 216 such as the hair and skin texture, that do not indicate detected current facial expression characteristics. Those features may be displayed from pre-captured images of the user's head 216, or may be from an avatar or placeholder image.

If the condition of block 120 is not satisfied, block 140 may be performed instead of block 130.

Block 140 comprises causing output of different data without causing display of the indication 406, if the condition is not satisfied. In an example, the output is display output and the different data comprises image data 402 captured by the camera 206. The head 216 is likely to be clearly visible in the image data 402 because the head 216 is sufficiently inside the field of view 224 of the camera 206 and facing the camera 206, that the condition is not satisfied. FIG. 4C shows an example of image data 402 captured by the camera 206 for block 140. FIG. 4C shows the user's head 216 of FIG. 3A, as captured live by the camera 206. The user's current facial expression is therefore represented in FIG. 4C.

As an alternative to the above implementation of block 140, the different output could comprise audio or haptic feedback, for example for prompting the user to move their head 216 and/or the camera 206 into a different relative placement to cause the condition to no longer be satisfied. Or, if the different output is display output, the different output could comprise a notification or any other alert. Alternatively, block 140 could be omitted altogether and non-satisfaction of the condition could result in the method 100 terminating or looping to block 110.

The background of FIG. 4D behind the user's head may be a static or moving image, and may even be captured live by the camera 206, depending on implementation. For example, when the condition is satisfied, the indication (block 130, FIG. 4D) may replace either a part(s) of, or the whole of, the displayed image data (block 140, FIG. 4C). In one example, the replacement may comprise forming a composite image wherein the indication (and/or representation 404) is a foreground object and the camera image data in the background surrounding the foreground object remains visible (partial replacement). This is useful if the user is talking about or reacting to something visible in image data from the camera 206. In another example, the display may automatically switch between displaying the indication without the image data, and displaying the image data without the indication, whenever the satisfaction state of the condition changes (whole replacement). The background may be predetermined, or configurable automatically and/or manually.

When the representation 404 is displayed, it may be centered as shown in FIG. 4D, or may be offset e.g. to a corner of the image. The scale of the indication may be large to better convey emotion, or small to be unobtrusive, or variable depending on a detected distance of the user from the camera 206. If the user's head 216 is still in the field of view 224, the indication may be aligned with the user's head 216. The sizing and/or alignment of the indication may be predetermined, or configurable automatically and/or manually.

The method 100 may be repeated periodically. The periodic repletion of the method 100 may result in a live feed of displayed information. The method may be repeated to automatically update a live feed of the displayed indication 406 and/or to automatically update a live feed of the image data 402. The average time interval between each repetition of the method 100 may be less than one second.

A difference between the displayed indication 406 of the characteristic (block 130, FIG. 4D) and the image data 402 of block 140 (FIG. 4C) is that the image data 402 is indicative of what is currently sensed by the camera 206, whereas the indication 406 is not indicative of what is currently sensed by the camera 206, because the characteristic is not clearly visible in the image data from the camera 206. This is due to the facial features being angled away from the camera 206. The indication 406 of FIG. 4D may instead be indicative of what is currently sensed by other sensors, which will be described below.

Figure 5:
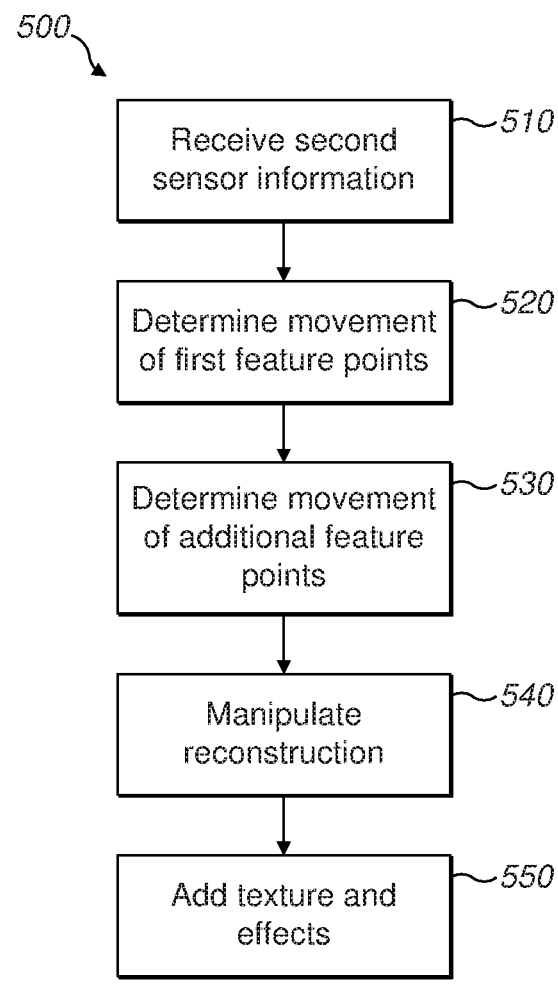
FIG. 5 illustrates an example of a method.

FIG. 5 illustrates an example of a method 500 of how to detect a characteristic and create a representation 404 suitable for display, that indicates that characteristic. The method 500 of FIG. 5 may be performed only if block 120 is satisfied, or may be 'always on' regardless of whether the condition is satisfied so that the user can choose to display the representation 404 instead of image data 402.

At block 510, the method 500 comprises receiving information indicative of the characteristic of the head, from at least one second sensor 218. The use of sensors means that it is not necessary for the user to manually input information indicative of their emotional state. The method 500 of FIG. 5 may be performed automatically, and repeated periodically as per the method 100 of FIG. 1.

The characteristic may be detected, e.g. by receiving information from at least one second sensor 218, at a time that ensures that the displayed indication of the characteristic indicates a current characteristic of the user. For example, the characteristic may be a current characteristic if the displayed indication shows a characteristic that is no more than a minute behind the user's characteristic at the time of display. In some examples, the delay may be no more than a second.

The at least one second sensor 218 will now be defined. The at least one second sensor 218 is a sensor(s) selected from a second group of one or more sensors. The second group of sensors comprises at least one sensor that is different from the first group of sensors, and that is not the camera 206. The camera 206 would be of limited use when the face is out-of-shot.

At least some of the second sensors 218 may be configured to detect the effect of muscle movement on a measurand. Specifically, at least some of the second sensors 218 may be configured to detect the effect of facial muscle movement. The facial muscle movement may comprise muscle tension. At least some of the second sensors 218 may be positioned in contact with or close to the user's head 216. The second sensors 218 may comprise one or more wearable sensors. The second sensors 218 may be worn while the methods of FIG. 1 and FIG. 5 are performed.

Figure 6:
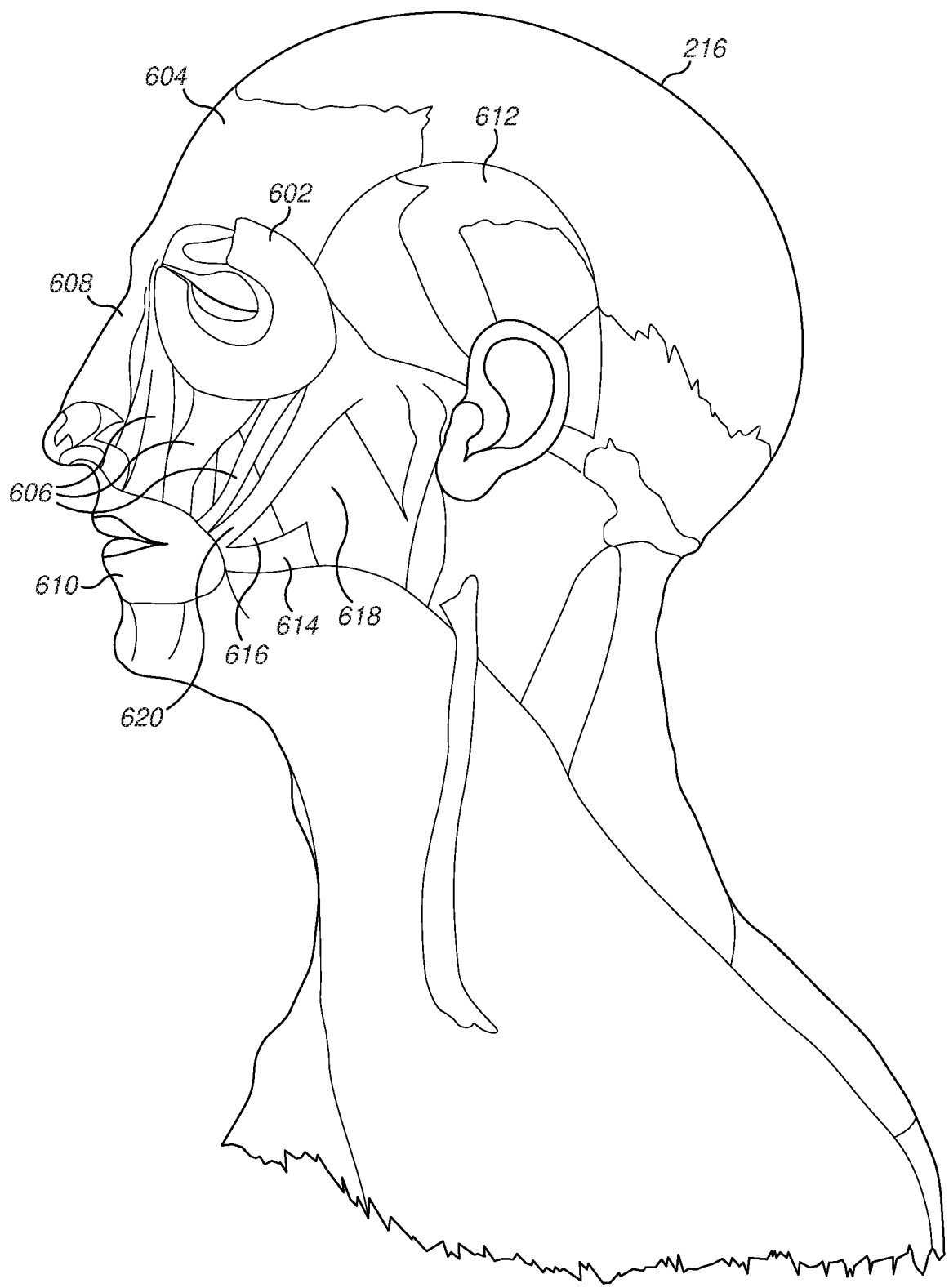
FIG. 6 illustrates facial muscles of a human head.

Specific positioning of at least some of the second sensors 218 in relation to specific facial muscles enables detection of the correlated effect of certain emotions on movement of specific groups of facial muscles. FIG. 6 shows the major facial muscles of the human head 216. Table 1 below indicates which muscles are involved with which emotions:

provides at least an aesthetic and/or non-medical function. Examples of wearable accessories include earables (or hearables) 700 (FIG. 7), spectacles 800 (FIG. 8), and/or any other type of wearable accessory (e.g. clothing, jewelry and hair accessories). An earable is a wearable accessory that can be worn in or on the ear. A hearable is defined herein as an earable with an audio speaker.

A wearable accessory ensures that a second sensor 218 is worn at a required location on a user's head. For the purposes of this disclosure, a required location is any location on the human head that moves in a manner detectable by a second sensor 218 in dependence on contraction and/or relaxation of a facial muscle. Such locations include locations on the head and may also include locations in an upper region of the neck which are otherwise anatomically classed as part of the neck.

In some, but not necessarily all examples, more than one second sensor 218 is worn, on one or more wearable accessories. Wearing multiple second sensors 218 may comprise wearing second sensors 218 that provide different sensing modalities.

Wearing multiple second sensors 218 may comprise wearing second sensors 218 for the same or different modalities at different locations on the user's head. In some examples, the required locations may be to the left and right sides of the head. The locations may be on symmetrically opposed sides of the head. This provides better discrimination between symmetrical and asymmetrical facial expressions (e.g. smile vs half smile). In other examples, the distribution of locations may be to target different facial muscles and may or may not involve symmetrical positioning.

A wearable accessory comprising the second sensor 218 may be configured to be worn in a re-usable manner. A re-usable manner means that the wearable accessory can be removed and later re-worn without irrevocable damage to the wearable accessory upon removal. The wearable accessory may be wearable on an outside of the user's body, such that no implant is required.

A wearable accessory comprising the second sensor 218 may be configured not to be single-use. For example, the wearable accessory may be configured for a friction and/or

TABLE 1 the muscles involved in the seven major human emotions

| Emotions | Muscles involved |
| --- | --- |
| Anger | Orbicularis oculi 602, Frontalis 604, Levator labii superioris 606, Procerus 608, auricularis superior |
| Fear | Orbicularis oculi 602, orbicularis oris 610, Frontalis 604, Temporalis 612, auricularis superior |
| Disgust | Orbicularis oculi 602, Risorius 614, Buccinator 616 |
| Happiness | Orbicularis oris 610, Levator labii superioris 606, Masseter 618, Zygomaticus 620, buccinator |
| Sadness | Orbicularis oris 610, Risorius 614, Procerus 608 |
| Surprise | Oribicularis oculi 602, Orbicularis oris 610, Zygomaticus 620, auricularis superior |
| Contempt | Orbicularis oculi 602, Levator labii superioris 606 |

The second group of sensors may comprise a force sensor and/or a bend sensor 708 and/or a proximity sensor 808 and/or or a capacitance sensor 706 and/or an inertial measurement unit 704 and/or an electromyography sensor. The inertial measurement unit 704 may also be used as one of the first sensors.

The second sensors 218 can be made wearable by attaching or embedding them within wearable accessories. An accessory as described herein means a wearable device that bias fit. This obviates the need for single-use adhesives, etc. However, in an alternative implementation, the wearable accessory is configured for single-use operation, for example the wearable accessory may be part of an adhesive patch.

The wearable accessory may comprise circuitry for enabling the second sensor 218 to function, such as an electrical power source and circuitry. The methods described herein may be performed by circuitry of the wearable accessories, or may be performed by external apparatus. The wearable accessories may comprise an interface which could comprise a wire or antenna, for communicating the information to external apparatus.

The wearable accessory may provide one or more wearable accessory functions. Examples of further functions of a wearable accessory include, but are not limited to providing a human-machine interface (input and/or output), noise cancellation, positioning additional sensors for other uses etc. Some wearable accessories may even comprise additional medical/non-accessory functions (e.g. corrective/tinted spectacle lenses, positioning health-monitoring sensors). The earable 700 of FIG. 7 could comprise an audio speaker. The spectacles 800 of FIG. 8 may comprise tinted lenses and/or corrective lenses.

Figure 7:
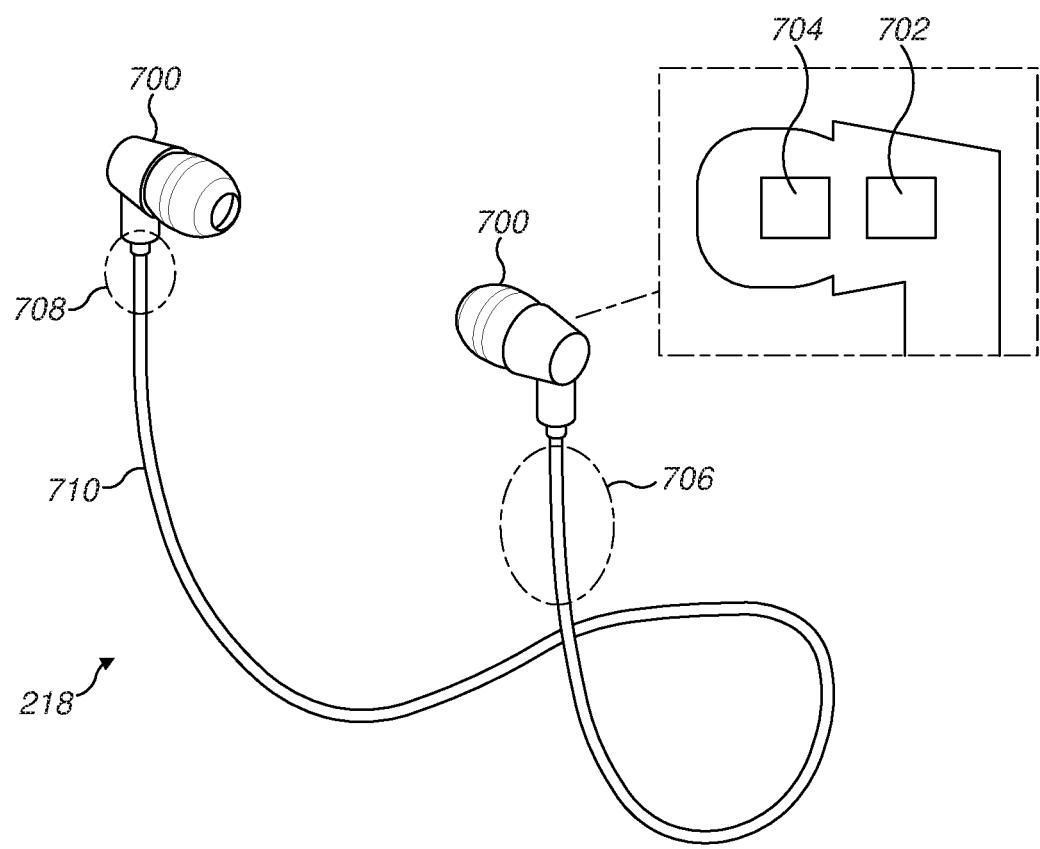
FIG. 7 illustrates an example earable comprising second sensors.

The earable 700 of FIG. 7 will be defined in greater detail. An advantage of earables 201 is convenience, compared to wearing specific clothing or unnecessary spectacles for example. Another advantage is that the earables 201 are positioned close to several facial muscles that are strongly correlated with common facial expressions.

FIG. 7 shows two earables 700 defining a wearable accessory, for use with left and right ears respectively. In other examples, just one earable 700 is provided for use with one ear only.

The earable 700 of FIG. 7 is an in-ear earable 700 for embedding in the auricle. The in-ear earable 700 may be configured for embedding proximal to the ear canal. The in-ear earable 700 may be configured for embedding in the concha or concha cavum. An advantage is that a relatively strong correlation exists between movement of facial muscles forming common facial expressions, and deformation or movement of the part of the ear in contact with the earable 700. This correlated movement can be leveraged by positioning the second sensor 218 within the earable 700 for the second sensor output to depend on the movement or deformation of the ear. Therefore, an earable 201, particularly an in-ear earable 201, significantly reduces the amount of data processing required for isolating meaningful signals from signal noise, compared to other wearable accessories. Other wearable accessories can work when positioned at various head locations specified herein, and form part of the present disclosure.

The earable 700 of FIG. 7 may comprise an inertial measurement unit (not shown) and/or electromyography sensor (not shown). The inertial measurement unit may be configured to detect motion of the head 216, such as nodding and/or shaking the head 216, and/or the effect of facial muscle movement on the ear. Information from the inertial measurement unit may be indicative of the strength and/or frequency of the nodding or shaking of the head 216. The inertial measurement unit may optionally belong to the first group of sensors as well, because it also enables a determination of relative placement.

The earable 700 of FIG. 7 may comprise a force sensor 702. The minimum sensitivity of the force sensor 702 may be 0.05N. The force sensor 702 could detect force, from pressure on the force sensor 702 by deformation of the ear. The deformation of the ear may be caused by tension of the auricularis superior and zygomaticus major, which relates to fear, anger and surprise emotion.

The earable 700 of FIG. 7 may comprise a bend sensor 708. The bend sensor 708 may be configured to detect bend of a wire 710 of the earable 700, if the earables are wired (e.g. headphone cables hanging down from the ears). When the masseter, zygomaticus and buccinator muscles are in tension (happiness), the face bulges which pushes the wires 710 and causes some bend. An example of a compact bend sensor for detecting the small bend of the wire is a nanosensor comprising a torsional optomechanical resonator and a waveguide such as fiber optic cable, for detection of torsion (bending).

The earable 700 of FIG. 7 may comprise a capacitance sensor 706. The capacitance sensor 706 may be provided in the wires 710. When the head 216 moves or expression changes, the face may touch a wire 710, causing a change of capacitance of the wire at a location along the wire 710. Happiness (smiling) can be detected using a capacitance sensor 706.

The earable 700 may be configured to maintain a predetermined orientation of the second sensor(s) 218 with respect to the user, to ensure clean data is obtained. In the example of FIG. 7, the earable 700 of FIG. 7 comprises an element configured to engage with the intertragic notch of the user's ear. The element may comprise a sleeve for the wire 710, configured to increase the effective stiffness of the wire 710 and reduce bending fatigue. If the earable 700 is wireless, the element could comprise an internal antenna for wireless communication, or could serve no other purpose than to engage with the intertragic notch to position the earable 700 in a predetermined orientation.

Figure 8:
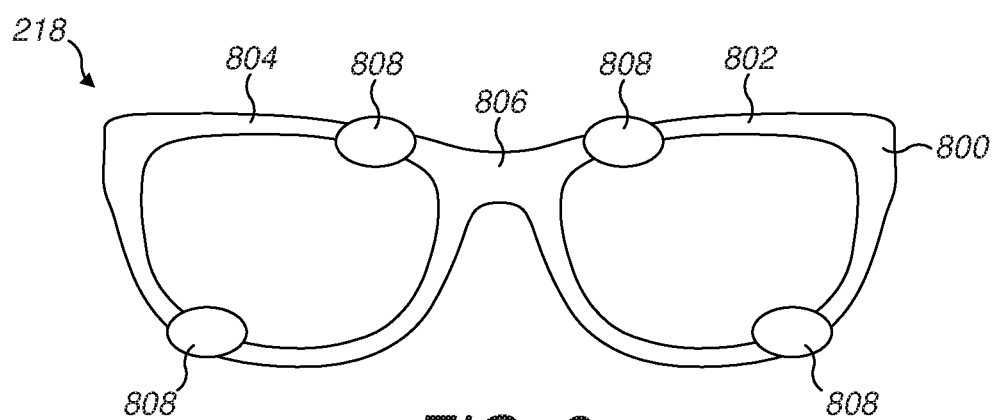
FIG. 8 illustrates an example of spectacles comprising second sensors.

One or more of the above-described second sensors 218 of the earable 700 may additionally or alternatively be part of another wearable, such as the spectacles 800 of FIG. 8.

The spectacles 800 of FIG. 8 will be defined in greater detail.

The spectacles 800 of FIG. 8 may comprise one or more proximity sensors 808 and/or electromyography sensors (not shown). The proximity sensors 808 may be configured to detect the distance between the spectacles and a respective local position on the face. When muscles around the eyes and nose (e.g. orbicularis oculi, frontalis, levator labii superioris, nasalis) tense up (e.g. contempt, disgust, sadness), the face around the eyes and nose may bulge and therefore change the distance between the local positions on the face and the corresponding proximity sensors 808. The specific type of emotion correlates with the amount of tension and therefore the amount of change of distance.

Four proximity sensors 808 are shown in FIG. 8 and the proximity sensors 808 are provided on the eye wires 802, 804: two on a left eye wire 804 and two on a right eye wire 802. The proximity sensors 808 comprise an upper pair and a lower pair of proximity sensors 808. The spacing of the lower pair of proximity sensors 808 is greater than the spacing of the upper pair of proximity sensors 808. The lower pair may be located in distal lower corners of the respective eye wires 802, 804, and the upper pair may be located around proximal upper corners of the respective eye wires 802, 804, near the bridge 806. However, a different number of proximity sensors 808 could be provided in other examples, and in a different arrangement.

The second group of sensors may optionally further comprise motion sensors (e.g. inertial measurement units) attached to the body, to detect body gestures accompanying changes of facial expression, therefore improving accuracy of emotion detection.

Once the information is received from the second sensor(s), the method 500 moves on to detect the characteristic(s) of the head 216, and determine the indication 406 to be displayed. The information from multiple second sensors 218 could be synthesized first, to increase accuracy. Blocks 520 to 550 show use of a technique which results in a realistic rendering of the user's head 216 and facial expression. However, in other examples, the indication 406 to be displayed could be much simpler and need not represent the actual user in any greater detail than recreating their detected facial expression characteristic(s).

In block 520, the method 500 comprises determining required movement of at least one first feature point, or a plurality of first feature points, associated with the information. The required movement of a first feature point is strongly correlated with and therefore measurable from an output of a corresponding second sensor 218, such that indicating a 'detected characteristic' as described herein may correspond to a required movement of a first feature point.

Figure 9A:
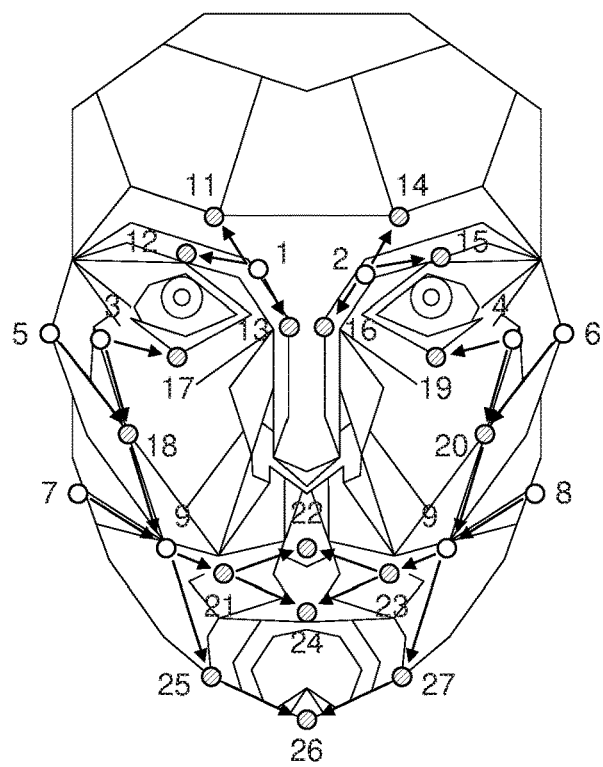
FIG. 9A illustrates an example of a head, showing movement dependencies of feature points.

FIG. 9A shows a head 216 comprising a plurality of predetermined feature points, of which some are first feature points and some are additional feature points. Each feature point relates to a different feature of the face and corresponds to a different facial location. The spatial density of feature points around a spatial domain corresponding to the face may be equal, or variable to increase the spatial density of feature points at expressive parts of the face. 27 feature points are shown in FIG. 9A and are referred to herein as d1-d27. The feature points d1-d10 are first feature points, and d11-d27 are additional feature points. A different number of first feature points could be provided in other examples.

The 27 illustrated feature points move in a related manner in dependence on facial muscle movements. For example, movement of the orbicularis oculi is associated with movement of d1, d2, d3, d4, d12, d13, d15, d16, d17 and d19. Movement of the orbicularis oris is associated with movement of d21, d22, d23 and d24. Movement of the frontalis is associated with movement of d11 and d14. Movement of the zygomaticus is associated with movement of d5, d6, d18 and d20. Movement of the depressor anguli oris is associated with movement of d25, d26 and d27.

Block 520 determines a required amount of movement of first feature points, proportional to the values of the sensed information. The proportionality could be predetermined as a result of experiment, and/or could be refined using machine learning (described later). At least the following highly-correlated associations between first feature points d1-d10 and second sensors 218 exist:

Proximity sensors 808 on the spectacles 800 are associated with feature points d1, d2, d3 and d4;
Force sensors 702 on earables 700 are associated with feature points d5 and d6;
Bend sensors 708 on earables 700 are associated with feature points d7 and d8; and
Capacitance sensors 706 of earables 700 are associated with feature points d9 and d10.

The method 500 then proceeds to optional block 530. Block 530 comprises determining a required amount of movement of additional feature points (e.g. d11-d27) in dependence on the feature points (e.g. d1-d10) determined in block 520. In this example, the computer model comprises an additional 17 feature points d11-d27 that are not directly associated with the outputs of the second sensors 218, but which are associated with movement of the first feature points d1-d10. This association can be determined via estimation, or via machine learning as described later. For instance, smiling changes the buccinator and masseter muscles, which means that when d9 changes, d21, d22, d24 and d25 may also change.

Mathematical models can be used to approximate the movement relationships between the feature points determined in block 520, and the additional feature points.

Figure 9B:
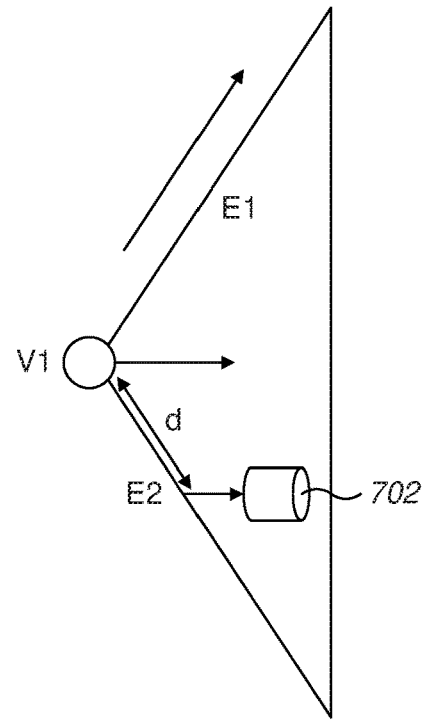
FIG. 9B illustrates an example of a geometric model describing movement dependencies of feature points.

In block 520 and/or block 530, a predetermined 3D triangular model may be used to determine the required movements of the additional feature points. An example of a 3D triangular model is illustrated in FIG. 9B. A plurality of 3D triangular models can be provided, to represent all of the 27 feature points.

For a particular face, the feature points d1-d27 can be divided into two groups:
Group 1 (G1): d1, d2, d11-d16, d3, d4, d17, d19; and
Group 2 (G2): d5-d10, d18-27.

G1 comprises first feature points from block 520 (e.g. d1, d2, d3 and d4), as well as some additional feature points (d11-d16, d17 and d19) determined to be associated with the first feature points by machine learning. Mathematical models associate each first feature point with one or more additional feature points.

An example model for G1, associating d1 with d11, is described below. If the observed sensor distance change is d, the original distance of d1 from d11 is a, and determined muscle extension rate is w, then the change a' of the distance of d1 from d11 for a given sensor observation is:

$$a' = \sqrt{(wa)^2 - d^2}$$

Additional feature points d12 and d13 can respectively be associated with d1. Additional feature points d14-d16 can respectively be associated with d2.

For G2, triangular models can be used to describe the relationships between feature points. FIG. 9B illustrates an example triangular model which denotes the temporalis muscle. When the temporalis tenses, the skin will move and will drive the vertex V1 (a feature point) to the right in FIG. 9B. This motion will increase pressure on the earable force sensor 702 when the edge E2 is moved to the right. Therefore, there is a relationship between pressure and the vertex. For FIG. 9B, a mathematical relationship can be derived, assuming that the measured pressure force is f, the muscle extension rate is w, the relationship between detected f and the face change follows function g, and the measured original distance between the feature point V1 and the influenced point (additional feature point) E2 is d:

$$f \sim g(wd)$$

The method 500 may comprise means for training a machine learning algorithm, wherein the machine learning algorithm is configured to control which feature points are manipulated in dependence on the information from the second sensor(s) and/or to what extent they are manipulated. For example, machine learning can be employed to obtain an accurate relationship between muscle extension rate w and measured data of d and f, for a given user (in-use training) or for any user (offline training).

The training for a given user could comprise causing a display 208 or other output device of a user's device, to show or describe required facial expressions for the user to try and match. The user can film themselves on a camera 206 to provide a training dataset of measurements of the movements of their feature points for given facial expressions. Image analysis can be used to determine the precise locations of feature points, in an example. The training dataset could train a neural network such as a convolutional neural network, or any other appropriate machine learning algorithm. The predicted relationships between feature points can then be refined by the observation, for example to minimise a loss function.

An example loss function is defined below. For each learning epoch T, the input will be the measured points into fi∈F, where F is the set of the first feature points (e.g. d1-d10) of block 520, as well as the measured 27-point coordination $\langle X_T, Y_T \rangle$. The output will be the new coordination of the points $\langle X_{T+1}', Y_{T+1}' \rangle$. The loss functions used in the learning process may comprise the distance function of predicted $\langle X_{T+1}', Y_{T+1}' \rangle$ compared to actual $\langle X_{T+1}, Y_{T+1} \rangle$, for example in the form of a mean-squared error or other suitable format:

$$L = \min \sum_{i \in (1 \ldots 27)} w_i \sqrt{(x_i - x_i')^2 + (y_i - y_i')^2}$$

Machine learning could be used not only to improve the models of the G2 parameters of block 530, but also to improve the models of the G1 parameter relationships, and to improve the determination of the required movement of the feature points of block 520. More generally, the machine learning could be used whenever the displayed indication 406 of block 130 is intended to indicate more than just the characteristics of the user directly detected by the second sensor(s).

Once the required movements for all of the detected characteristics (feature points) have been determined for the given sensor information, the method 500 proceeds to block 540.

At block 540, the method 500 comprises manipulating feature points of a reconstruction of the face (which could be a reconstruction of the whole head 216 or of just the face), based on the detected characteristic(s). The reconstruction may be a 3D reconstruction, or alternatively a 2D reconstruction. The reconstruction may be based on pre-captured images of the head 216, for instance captured before a video communication session during which the methods of this disclosure may take place. Therefore, until the reconstruction is manipulated as described below, the reconstruction may not indicate a detected current characteristic of the head. The pre-captured images may be of the face with a neutral, emotionless expression, to provide base data. The reconstruction may comprise a mesh, such as a triangular mesh, or may comprise voxels or any other appropriate data structure. The mesh may represent the tangent space (surface) of the reconstructed face.

Figure 10B:
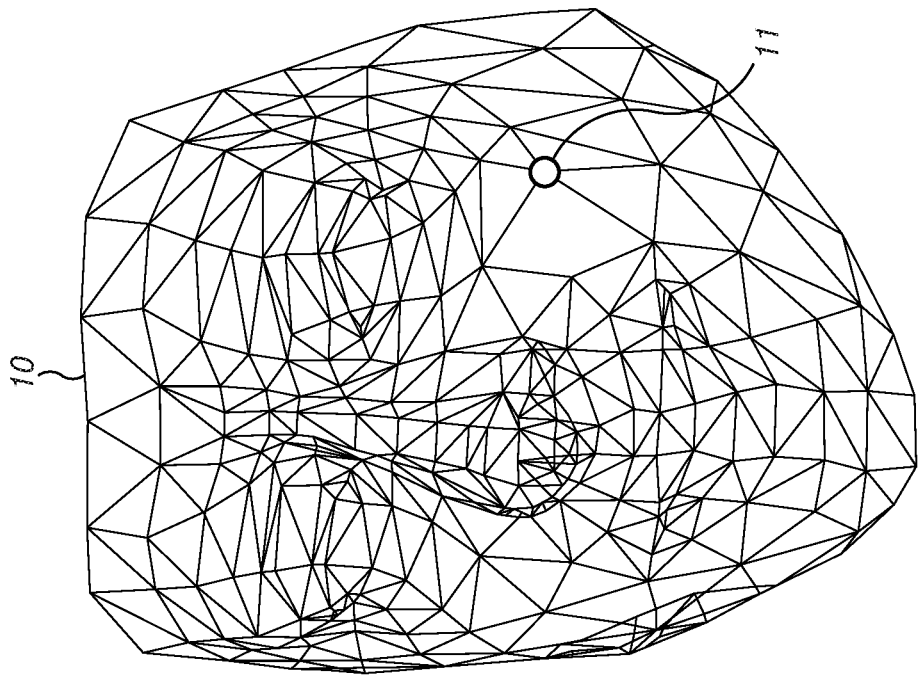
FIG. 10B illustrates an example of the head reconstruction after manipulation.
Figure 10A:
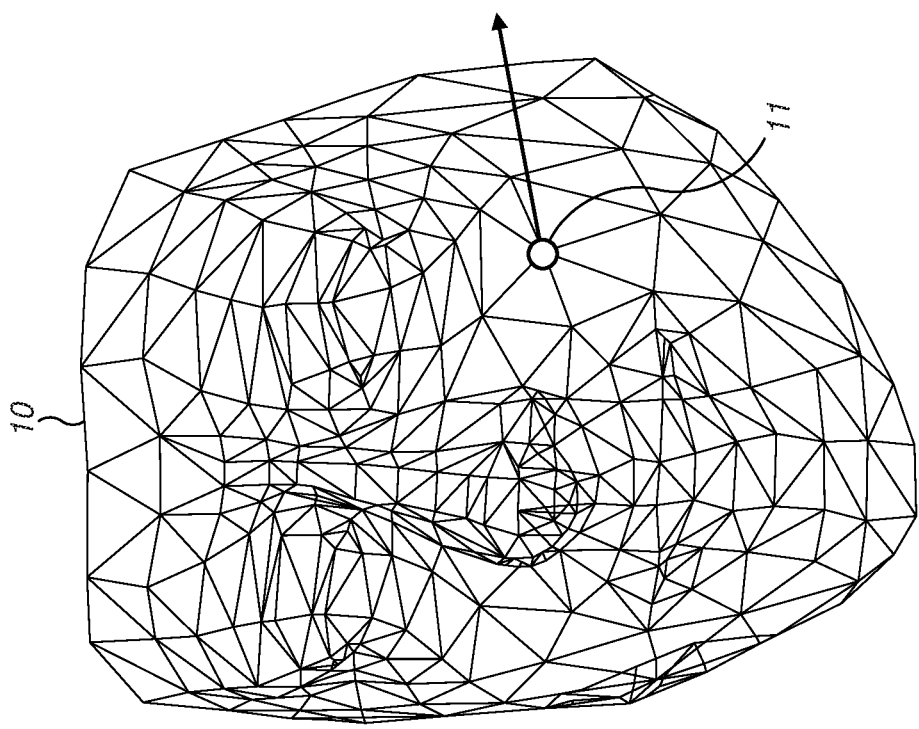
FIG. 10A illustrates an example of a head reconstruction, showing a feature point highlighted for manipulation.

FIG. 10A illustrates an example of the reconstruction 10, showing one feature point to be manipulated. A feature point is associated with a particular vertex 11 of the reconstruction 10. Movement of a feature point corresponds to movement of the vertex 11. FIG. 10B illustrates an example of the reconstruction 10 of FIG. 10A, but after the feature point has been manipulated. A cheek vertex 11 is visibly puffed out relative to the same vertex 11 in FIG. 10A, therefore indicating the at least one detected characteristic as described herein.

In some examples, if the required amount of movement of a feature point/vertex 11 is below a threshold β, the vertex 11 is not changed. The value of the threshold β may depend on a configured resolution of the mesh and/or a bump map (if provided).

For nodding and shaking movements, the manipulation could comprise translation or rotation of the whole reconstructed head. For changes of facial expression that involve specific facial muscles, the manipulation could comprise contorting the tangent space via the feature points, to indicate a change of the facial expression of the reconstructed head.

At block 550, the method 500 comprises adding further details of the human head, e.g. the texture (e.g. skin texture, hair), colour and bumps (wrinkles). This conveys the emotional state better than if a generic avatar were used. However, in some examples, the user may have the option to customize their reconstruction 10, and/or its texture/bumps/colours.

The texture, colour and bumps could be available from the pre-captured images of the head 216. Mathematical operations of known type are performed to map the texture/bump map onto the manipulated reconstruction 10 of the face. Known lighting effects can be applied to better illustrate details of the user's emotion, and optionally lighting effects could be configured to recreate detected lighting parameters in the user's actual location as detected by the camera 206.

Once block 550 is complete, the method may proceed to block 130 if the condition is satisfied. In this example, block 130 may comprise causing display of the representation 404 in the form of the manipulated reconstruction of the face complete with any texture and effects.

Figure 11A:
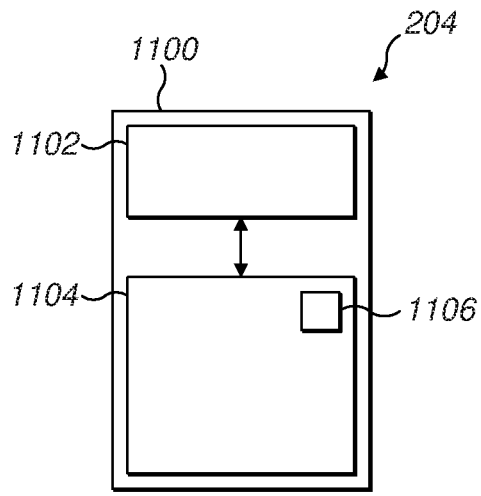
FIG. 11A illustrates an example of an apparatus.

All of the methods and features described above may be carried out by an apparatus 204 such as the one shown in FIG. 11A. The apparatus 204 may be provided in a common device 202 along with the camera 206, as shown in FIG. 2, or can be provided in a separate device from the device 202 that comprises the camera 206.

Therefore, in one example there is provided a device 202 comprising the apparatus 204 and the camera 206, and in another example, there is provided a system 200 comprising the apparatus 204 and separate camera 206. The system 200 may optionally comprise one or more of the first sensor(s) 212 and/or second sensor(s) 218.

FIG. 2 illustrates a potential implementation of a device 202 comprising the apparatus 204 and the camera 206. The device 202 may optionally further comprise one or more of the following additional components:
 a display 208 (e.g. using light-emitting diodes, liquid crystals or other known underlying technologies);
 a user interface 210 (e.g. touch screen, buttons, sliders, or other known underlying technologies);
 the apparatus 204;
 at least one of the first sensor(s) 212; and
 an input/output device 214 configured to transmit and/or receive data between the device 202 and an input/output device 220 of an external device (e.g. wearable or other device), using a wired or wireless connection.

The device 202 of FIG. 2 may optionally comprise multiple cameras, for example one or more front-face cameras and/or one or more rear-face cameras.

The device 202 of FIG. 2 may be hand-portable electronic device 202. The hand-portable electronic device 202 may be a smartphone, tablet or laptop. The hand-portable electronic device 202 may integrate all of the components of FIG. 2 into one housing. The device 202 may be less than 500 g in weight, to enable the device 202 to be easily held at arms-length to capture 'selfie'-style images and videos.

A potential use case of the methods described herein comprises performing the methods during a video communication session in which image data (e.g. from the camera 206) is communicated between devices. The devices may be separated across a wide area network and/or a local area network. The video communication session could be managed by a software application configured for one or more of: video-conferencing; video chat; video-sharing; or video-streaming. The communication could be one way or both ways. The displayed indication/image data as described above may be a live feed and the method 100, 500 may be repeated frequently as described above. Other potential use cases include monitoring uses, for example to monitor the emotional state or fatigue of workers or health patients even when they are out-of-shot of a camera 206.

In some implementations, a privacy option to prevent the display of the indications 406 may be accessible via the user interface 210. This would be helpful for users who do not want their emotional state to be known when they are out-of-shot of the camera 206, for example.

During a formal interview via videoconference, some participants may wish to confer in private while out-of-shot. A simple single-press off/on control displayed on a display 208 concurrently to the other captured images described herein, would be efficient, to avoid delays in switching between privacy options. However, the privacy option control can take any other form, depending on implementational requirements.

FIG. 11A illustrates an example of a controller 1100. Implementation of a controller 1100 may be as controller circuitry. The controller 1100 may be implemented in hardware alone, have certain aspects in software including firmware alone or can be a combination of hardware and software (including firmware).

As illustrated in FIG. 11A the controller 1100 may be implemented using instructions that enable hardware functionality, for example, by using executable instructions of a computer program 1106 in a general-purpose or special-purpose processor 1102 that may be stored on a computer readable storage medium (disk, memory etc) to be executed by such a processor 1102.

The processor 1102 is configured to read from and write to the memory 1104. The processor 1102 may also comprise an output interface via which data and/or commands are output by the processor 1102 and an input interface via which data and/or commands are input to the processor 1102.

The memory 1104 stores a computer program 1106 comprising computer program instructions (computer program code) that controls the operation of the apparatus 204 when loaded into the processor 1102. The computer program instructions, of the computer program 1106, provide the logic and routines that enables the apparatus to perform the methods illustrated in FIGS. 1 and 5. The processor 1102 by reading the memory 1104 is able to load and execute the computer program 1106.

The apparatus 204 therefore comprises:
at least one processor 1102; and
at least one memory 1104 including computer program code
the at least one memory 1104 and the computer program code configured to, with the at least one processor 1102, cause the apparatus 204 at least to perform:
receiving information indicative of a relative placement of an object and a camera 206; determining, in dependence on the information, whether a condition associated with relative placement of the object and the camera 206 is satisfied; and causing display of an indication 406 of at least one detected characteristic of the object if the condition is satisfied.

Figure 11B:
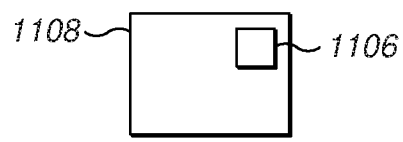
FIG. 11B illustrates an example of a computer readable storage medium.

As illustrated in FIG. 11B, the computer program 1106 may arrive at the apparatus 204 via any suitable delivery mechanism 1106. The delivery mechanism 1106 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 1106. The delivery mechanism may be a signal configured to reliably transfer the computer program 1106. The apparatus 204 may propagate or transmit the computer program 1106 as a computer data signal.

Computer program instructions for causing an apparatus to perform at least the following or for performing at least the following: causing receiving information indicative of a relative placement of an object and a camera 206; causing determining, in dependence on the information, whether a condition associated with relative placement of the object and the camera 206 is satisfied; and causing display of an indication 406 of at least one detected characteristic of the object if the condition is satisfied.

The computer program instructions may be comprised in a computer program, a non-transitory computer readable medium, a computer program product, a machine readable medium. In some but not necessarily all examples, the computer program instructions may be distributed over more than one computer program.

Although the memory 1104 is illustrated as a single component/circuitry it may be implemented as one or more separate components/circuitry some or all of which may be integrated/removable and/or may provide permanent/semi-permanent/dynamic/cached storage.

Although the processor 1102 is illustrated as a single component/circuitry it may be implemented as one or more separate components/circuitry some or all of which may be integrated/removable. The processor 1102 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:
(a) hardware-only circuitry implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions and
(c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the FIGS. 1 and 5 may represent steps in a method and/or sections of code in the computer program 1106. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

The capturing of data may comprise only temporary recording, or it may comprise permanent recording or it may comprise both temporary recording and permanent recording. Temporary recording implies the recording of data temporarily. This may, for example, occur during sensing or image capture, occur at a dynamic memory, occur at a buffer such as a circular buffer, a register, a cache or similar. Permanent recording implies that the data is in the form of an addressable data structure that is retrievable from an addressable memory space and can therefore be stored and retrieved until deleted or over-written, although long-term storage may or may not occur. The use of the term 'capture' in relation to an image relates to either temporary or permanent recording of the data of the image.

The systems, apparatus, methods and computer programs may use machine learning which can include statistical learning. Machine learning is a field of computer science that gives computers the ability to learn without being explicitly programmed. The computer learns from experience E with respect to some class of tasks T and performance measure P if its performance at tasks in T, as measured by P, improves with experience E. The computer can often learn from prior training data to make predictions on future data. Machine learning includes wholly or partially supervised learning and wholly or partially unsupervised learning. It may enable discrete outputs (for example classification, clustering) and continuous outputs (for example regression). Machine learning may for example be implemented using different approaches such as cost function minimization, artificial neural networks, support vector machines and Bayesian networks for example. Cost function minimization may, for example, be used in linear and polynomial regression and K-means clustering. Artificial neural networks, for example with one or more hidden layers, model complex relationship between input vectors and output vectors. Support vector machines may be used for supervised learning. A Bayesian network is a directed acyclic graph that represents the conditional independence of a number of random variables.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although embodiments have been described in the preceding paragraphs with reference to various examples, it should be appreciated that modifications to the examples given can be made without departing from the scope of the claims. The detected characteristic described in examples above is a facial expression, which is an example of a dynamic (temporally varying) characteristic of expression. In other examples, the characteristic is any other detectable dynamic characteristic of expression. In further examples, the object can be any other object possessing dynamic characteristics.

Features described in the preceding description may be used in combinations other than the combinations explicitly described above.

Although functions have been described with reference to certain features, those functions may be performable by other features whether described or not.

Although features have been described with reference to certain embodiments, those features may also be present in other embodiments whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer and exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

What is claimed is:

1. An apparatus comprising:
   at least one processor; and
   at least one memory storing instructions that, when executed with the at least one processor, cause the apparatus at least to:
   receive information indicative of a relative placement of an object and a camera;
   determine, in dependence on the information, whether a condition associated with the relative placement of the object and the camera is satisfied, wherein the condition comprises, at least, whether a deviation, of the relative placement of the object and the camera, from a reference relative placement of the object in a field of view of the camera, exceeds a threshold;
   detect at least one characteristic of the object in dependence on information indicative of the at least one characteristic received from at least one second sensor; and
   cause display of an indication of the at least one detected characteristic of the object in response to the condition being satisfied, wherein the indication is based, at least partially, on a reconstruction of the object that is manipulated to indicate the at least one detected characteristic.

2. The apparatus of claim 1, wherein the at least one memory stores instructions that, when executed with the at least one processor, further cause the apparatus to:
   display image data captured by the camera without the indication, in response to the condition not being satisfied.

3. The apparatus of claim 1, wherein in response to the condition being satisfied, the display of the indication of the at least one detected characteristic replaces at least part of displayed image data.

4. The apparatus of claim 1, wherein the object comprises a human head.

5. The apparatus of claim 1, wherein the at least one detected characteristic is dependent on facial expression, wherein the at least one detected characteristic comprises at least one emotional characteristic associated with the object.

6. The apparatus of claim 1, wherein the at least one memory stores instructions that, when executed with the at least one processor, further cause the apparatus to:
   cause display of indications of a plurality of detected characteristics of the object in response to the condition being satisfied.

7. The apparatus of claim 6, wherein the plurality of detected characteristics are associated with a plurality of different features of a face or body.

8. The apparatus of claim 1, wherein the relative placement comprises relative position or relative orientation.

9. The apparatus of claim 8, wherein satisfaction of the condition is dependent on whether at least part of the object is positioned outside the field of view of the camera.

10. The apparatus of claim 8, wherein satisfaction of the condition is dependent on whether the object is oriented to face away from the camera, or wherein satisfaction of the condition is dependent on whether an orientation of the object is pitched at least upwardly relative to an optical axis associated with the camera.

11. The apparatus of claim 1, wherein the information indicative of the relative placement is from at least one first sensor configured to detect a change in the relative placement, wherein the at least one first sensor comprises an inertial measurement unit or an imaging sensor.

12. The apparatus of claim 1, wherein the at least one second sensor comprises at least one wearable sensor.

13. The apparatus of claim 1, wherein the at least one second sensor is configured to detect an effect of muscle movement on a measurand.

14. The apparatus of claim 1, wherein the reconstruction of the object is based on pre-captured images of the object.

15. The apparatus of claim 1, wherein the manipulation is further based on machine learning, wherein the reconstruction of the object is manipulated via at least one of:
   translation of at least part of the reconstruction of the object,
   rotation of the at least part of the reconstruction of the object,
   movement of the at least part of the reconstruction of the object, or
   contortion of the at least part of the reconstruction of the object.

16. The apparatus of claim 1, wherein the at least one memory stores instructions that, when executed with the at least one processor, further cause the apparatus to:
   periodically update the displayed indication during a video communication session in which the indication is communicated between devices.

17. A method comprising:
   receiving information indicative of a relative placement of an object and a camera;
   determining, in dependence on the information, whether a condition associated with the relative placement of the object and the camera is satisfied, wherein the condition comprises, at least, whether a deviation, of the relative placement of the object and the camera, from a reference relative placement of the object in a field of view of the camera, exceeds a threshold;
   detecting at least one characteristic of the object in dependence on information indicative of the at least one characteristic received from at least one second sensor; and
   causing display of an indication of the at least one detected characteristic of the object in response to the condition being satisfied, wherein the indication is based, at least partially, on a reconstruction of the object that is manipulated to indicate the at least one detected characteristic.

18. The method of claim 17, wherein in response to the condition being satisfied, the display of the indication of the at least one detected characteristic replaces at least part of displayed image data.

19. The method of claim 17, wherein satisfaction of the condition is dependent on whether at least part of the object is positioned outside the field of view of the camera.

20. A non-transitory computer readable medium comprising program instructions stored thereon for performing at least the following:
   receiving information indicative of a relative placement of an object and a camera;
   determining, in dependence on the information, whether a condition associated with the relative placement of the object and the camera is satisfied, wherein the condition comprises, at least, whether a deviation, of the relative placement of the object and the camera, from a reference relative placement of the object in a field of view of the camera, exceeds a threshold;

detecting at least one characteristic of the object in dependence on information indicative of the at least one characteristic received from at least one second sensor; and causing display of an indication of the at least one detected characteristic of the object in response to the condition being satisfied, wherein the indication is based, at least partially, on a reconstruction of the object that is manipulated to indicate the at least one detected characteristic.

\* \* \* \* \*